US006918964B2

(12) United States Patent
Shullman et al.

(10) Patent No.: US 6,918,964 B2
(45) Date of Patent: Jul. 19, 2005

(54) MECHANIZED ANTHROPOMORPHIC CAR WASH APPARATUS

(76) Inventors: Michael Shullman, 725 Cheese Spring Rd., New Canaan, CT (US) 06840; Thomas Mayhew, 35 Putnam Park Rd., Redding, CT (US) 06896

( * ) Notice: Subject to any disclaimer, the term of this patent is extended or adjusted under 35 U.S.C. 154(b) by 0 days.

(21) Appl. No.: 10/733,084

(22) Filed: Dec. 11, 2003

(65) Prior Publication Data

US 2005/0126604 A1 Jun. 16, 2005

(51) Int. Cl.$^7$ ................................................ B08B 7/00
(52) U.S. Cl. ..................... 134/18; 446/354; 700/245; 15/DIG. 2; 15/53.1; 15/97.3; 134/86; 134/40; 134/42
(58) Field of Search ................ 15/DIG. 2, 53.1, 15/97.3; 446/354; 700/245; 134/18, 40, 42

(56) References Cited

U.S. PATENT DOCUMENTS

| | | | | | |
|---|---|---|---|---|---|
| 2,119,641 | A | * | 6/1938 | Marx | 446/314 |
| 3,729,763 | A | * | 5/1973 | Coley | 15/53.4 |
| 4,850,382 | A | * | 7/1989 | Williams | 134/167 R |
| 4,924,892 | A | * | 5/1990 | Kiba et al. | 134/123 |
| 5,016,662 | A | * | 5/1991 | Crotts et al. | 134/45 |
| 5,261,603 | A | * | 11/1993 | Driska | 239/211 |
| 5,561,883 | A | * | 10/1996 | Landry et al. | 15/302 |
| 5,642,745 | A | * | 7/1997 | Landry et al. | 134/167 R |
| 6,213,135 | B1 | * | 4/2001 | Moulder | 134/167 R |
| 6,287,389 | B1 | * | 9/2001 | McGuire | 134/18 |
| 6,343,241 | B1 | * | 1/2002 | Kohut et al. | 700/232 |
| 6,633,150 | B1 | * | 10/2003 | Wallach et al. | 318/568.12 |
| 2002/0007230 | A1 | * | 1/2002 | Ueno et al. | 700/245 |
| 2002/0121291 | A1 | * | 9/2002 | Daum et al. | 134/8 |

FOREIGN PATENT DOCUMENTS

| | | | |
|---|---|---|---|
| GB | 2170622 A | * | 8/1986 |
| JP | 63297150 A | * | 12/1988 ............. B60S/5/00 |

* cited by examiner

*Primary Examiner*—Sharidan Carrillo
(74) *Attorney, Agent, or Firm*—Grimes & Battersby, LLP

(57) ABSTRACT

An automated car wash system is provided comprising an anthropomorphic robot that serves to spray and clean cars prior to their entering into, or within, an automated car wash so as to remove surface dirt from the car, using a high-pressure spray gun. The robot is controlled by an interconnected network of pneumatic or hydraulic pumps and hoses, electronic relays and mechanical linkages so as to simulate the movements of a human. A sensor is used to detect the presence of an automobile in the field of operation of the robot, which sensor also serves to activate the robot and keep it operational as long as the automobile is in a given location. The robot is configured to resemble the shape and size of a human such that it may be dressed in a variety of costumes or outfits so as to maximize both its entertainment value and its utilitarian function.

9 Claims, 3 Drawing Sheets

MECHANIZED ANTHROPOMORPHIC CAR WASH APPARATUS

BACKGROUND OF THE INVENTION

1. Field of the Invention

The present invention relates generally to an automated car wash apparatus, and, more particularly, to such an apparatus that is an anthropomorphic robot that serves to spray and clean cars prior to entering into, or within, an automated car wash so as to remove surface dirt from the car. Such a device is more efficient and consistent than a human performing the same task, particularly since the high-pressure spray guns and hoses that are used for this function weigh 15 pounds or more and can be difficult for a human to manipulate for prolonged periods of time manipulative. The apparatus also provides entertainment value for the customers of a car wash facility, particularly since it can be dressed in a variety of outfits or costumes as the occasion warrants, and may be configured so as to appear as a variety of different characters.

2. Description of the Prior Art

The prior art fails to specifically address either the problem or the solution arrived upon by applicant. Automated car wash assemblies have long been known in the car wash industry, many of which use conveyor belts or similar devices to advance a car through a car wash facility wherein water is sprayed onto the car, soap and/or wax is applied and removed, and the water removed using high-powered fans.

The use of animated figures in a car wash is disclosed in U.S. Pat. No. 6,088,864, which issued to Smith, II on Jul. 18, 2000 for "Apparatus and method for operating a thematic car wash assembly having a number of animated figures associated therewith." However, the animated figures in Smith are principally provided for entertainment or thematic value, and any water that such figures may spray onto a passing car is strictly incidental to the primary function of the figures.

As will be appreciated, the prior art does not even address the problem faced by applicant let alone offer the solution proposed herein.

SUMMARY OF THE INVENTION

Against the foregoing background, it is a primary object of the present invention to provide a programmable robot that serves to spray and clean cars using a high-pressure spray gun prior to entering into, or within, an automated car wash so as to remove surface dirt from the car.

It is another object of the present invention to provide such a robot that is configured in an anthropomorphic design.

It is still another object of the present invention to provide such a robot that may replace human car wash attendants who are unable to effectively operate the often heavy equipment for extended periods of time.

It is another object of the present invention to provide such a robot that is both entertaining to patrons of the car wash as well as utilitarian.

It is another object of the present invention to provide such a robot that may take a variety of different shapes or forms, or be clothed in a variety of costumes dependent upon the particular circumstances or time of year.

It is yet another object of the present invention to provide such a robot that may be configured in the shape or appearance of a variety of different characters.

It is but another object of the present invention to provide such a robot that is simple to set up and operate.

To the accomplishments of the foregoing objects and advantages, the present invention, in brief summary, comprises an anthropomorphic robot that serves to spray and clean cars prior to their entering into, or within, an automated car wash so as to remove surface dirt from the car, using a high-pressure spray gun. The robot is controlled by an interconnected network of pneumatic or hydraulic pumps and hoses, electronic relays and mechanical linkages so as to simulate the movements of a human. A sensor is used to detect the presence of an automobile in the field of operation of the robot, which sensor also serves to activate the robot and keep it operational as long as the automobile is in a given location. The robot is configured to resemble the shape and size of a human such that it may be dressed in a variety of costumes or outfits so as to maximize both its entertainment value and its utilitarian function.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

DETAILED DESCRIPTION OF THE INVENTION

Figure 1:
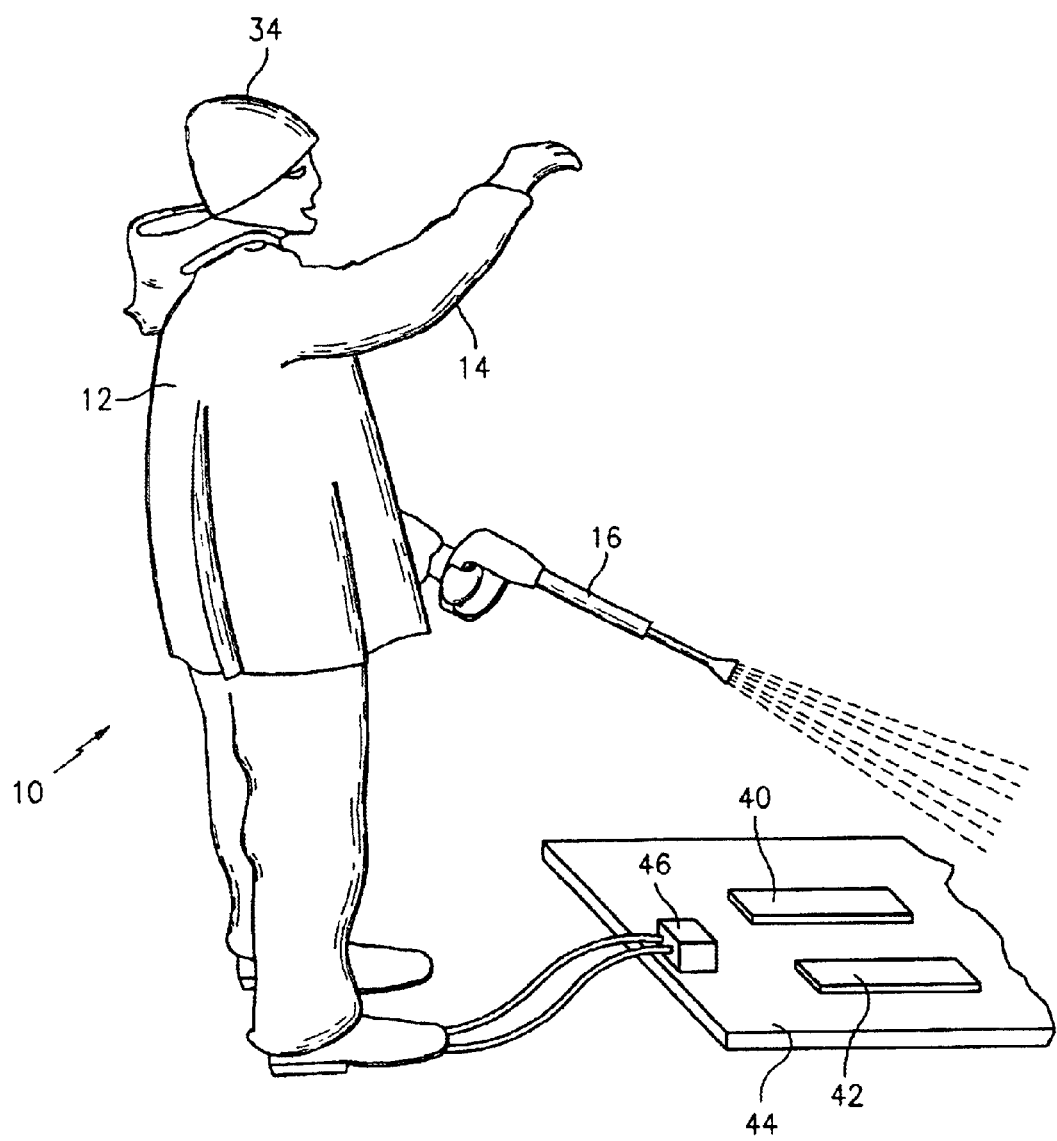
FIG. 1 is a perspective view of the mechanical elements of the anthropomorphic robot of the present invention.
Figure 2:
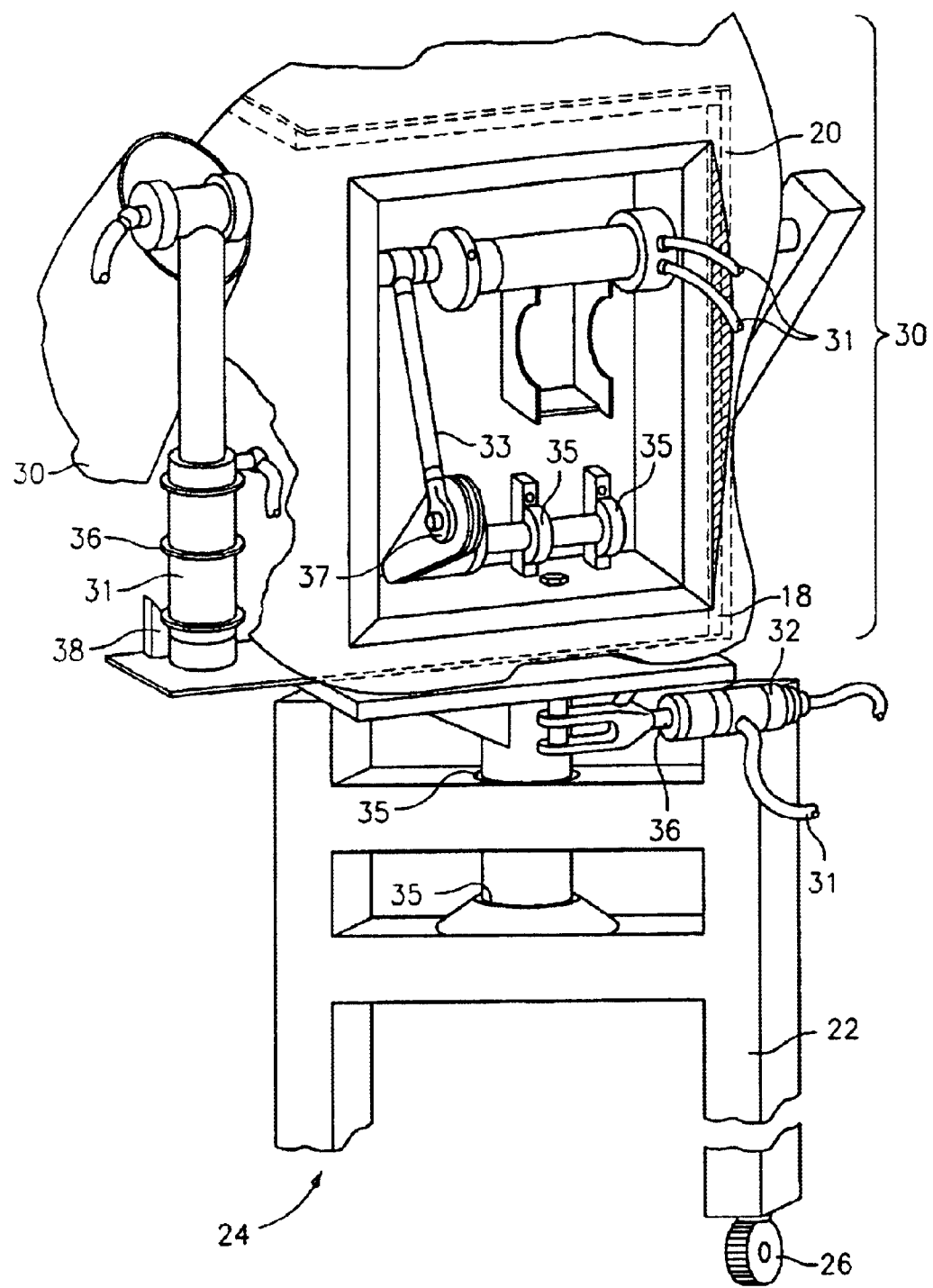
FIG. 2 is a close-up perspective view of the structure on the anthropomorphic robot of the present invention that accepts the high powered water hose and operates same.
Figure 3:
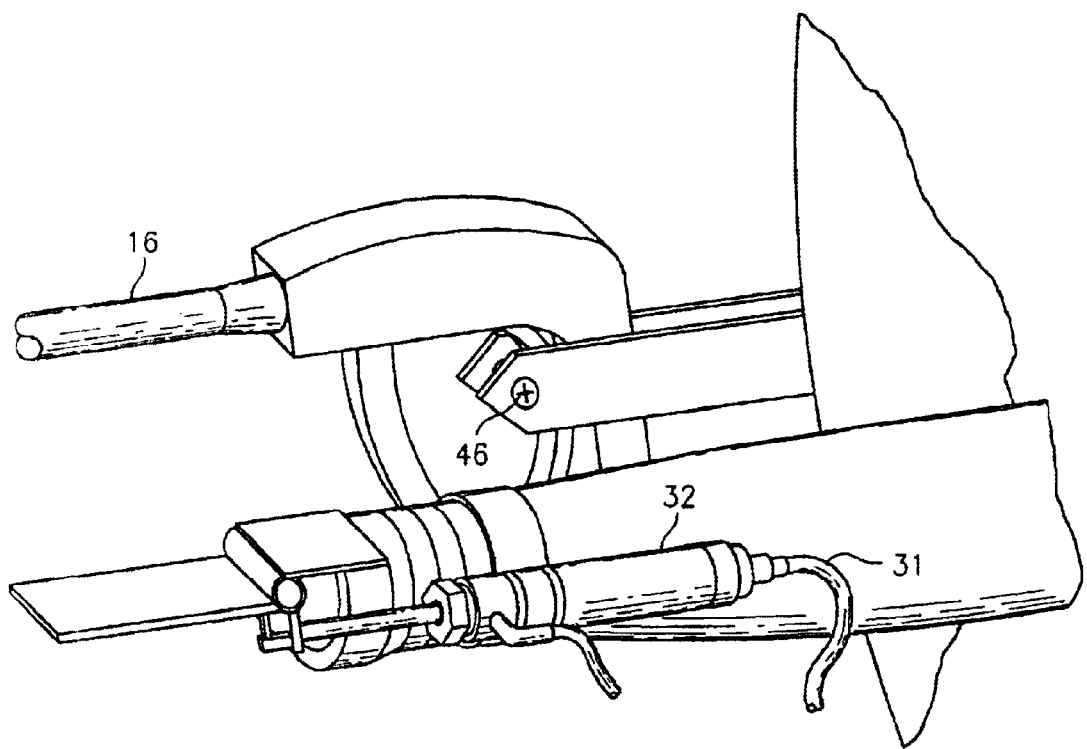
FIG. 3 is a front perspective view illustrating the hydraulic motor interaction with the spray gun.

Referring to the drawings and, in particular, to FIGS. 1 and 2 thereof, the interactive anthropomorphic robot of the present invention, referred to generally by reference numeral 10, is illustrated. The robot 10 comprises a main body 12 and at least one appendage 14, said appendage 14 serving to operate the high pressure spray gun 16. The main body 12 and appendage 14 may take a variety of forms, depending upon the person or creature the robot 10 is formed to simulate. In the preferred embodiment, however, the robot 10 is in the configuration of a man, wherein the main body 12 is in the shape of a man's head, legs and torso, and the appendage 14 takes the form of the man's arm and hand, which hold the spray gun 16. In such embodiment, the robot 10 may be dressed in a variety of costumes, such as a rain slicker, Santa Claus costume or clown costume, depending upon the particular situation. It should be appreciated that the main body 12 and appendage 14 may take a variety of forms or characters, both human, animal and otherwise, provided, of course, that the configuration of the appendage 14 is appropriate for the configuration of the main body 12, and the configuration of both appendage 14 and main body 12 are suitable for operating the spray gun 16. An example of the type of spray gun 16 that may be operated by the robot 10 of the present invention is a 8 g.p.m. plunger type pump which is spun using a 7.5 hp 3 phase electric motor at 1750 r.p.m. Spraying pressure for this example is set at 800 p.s.i.

The structure of the anthropomorphic robot 10 is a framework 18 composed of a rigid material capable of withstanding the forces and pressures associated with the operation of the high pressure spray gun 16. In the preferred embodiment, the framework 18 includes an upper skeleton 20 formed out of cold-rolled steel, and legs 22 and mounting base 24 composed of stainless steel. It should be appreciated, however, that other materials may be used in the fabrication of these elements, such as, for example, if higher tensile strengths are required or a lighter robot 10 is desired. Wheels 26 may be provided on mounting base 24 so as to facilitate the movement of the robot 10 as a whole unit. Outer body panels 28 serve to provide the robot 10 with a particular form and to protect the internal mechanisms of the robot 10. In the preferred embodiment such panels 28 are fabricated from a rigid, waterproof material such as P.E.T.G. vacuum formed plastic, which are then screwed to the skeleton 20. Individual elements such as heads, feet, hands and the like may be formed of the same material and similarly be attached to the framework 18. These elements may also be composed of fiberglass or like substances.

Control of the robot 10 is accomplished by a system of pneumatic or hydraulic pumps 30 which serve to move the appendage 14 and the upper skeleton 20 so as to simulate a variety of movements, such as waving, lifting of the arm, turning at the waist, bending over, spraying or turning the head 34. The system of pumps 30 comprises a series of hoses 31 interconnecting variety of air pistons or hydraulic motors 32 by which operate either independently or in conjunction with each other to move the various components or appendages 14 of the robot 10. In the preferred embodiment, one or more of the pumps 30 are attached to the movable components or appendages 14 by means of tie rods 33 or similar linkages. Bearings 35 are used to guide the mechanical components of the system, such as cams and camshafts 37, which components are configured so as to impart lifelike movement to the appendages 14. For example, a wave of the arm, said arm being the appendage 14, is done using one ¾" bore×¾" stroke piston, and the arm lift is accomplished using one 1½" bore×2" stroke. The turn of the robot's body at the waist is done using one 1¹/₁₆" bore×1" stroke piston and the body tilt is done using one 1½" bore×¾" stroke. The turn of the robot's head 34 is accomplished by one ¾" bore×1¼" stroke, and the spraying motion of the appendage 14 is dune using 1½" bore×2" stroke. Of course, these figures are merely examples of the specification for the pneumatic system 30, since various pistons 32 with different configurations may be utilized in a variety of different arrangements to simulate practically any lifelike movement. Hinges may also be used for individual components of the robot 10, such as the hands, which hinged elements may similarly be moved by the pistons 32.

The air pistons 32 are individually controlled using solenoid valves 36, which in the preferred embodiment are 12 volt dc circuit normally closed air solenoids. The solenoids 36 serve as a valve within the air pistons 32 which, when energized, change the flow of air within the air piston 32 so as to change the direction of the piston stroke, thus creating simulated body movements for the robot 10. Certain movements, such as the hand wave and spray motion, are also controlled using a repeat cycle timer 38, which turns 12 volts of dc current to the solenoid 36 rapidly so as to create the side to side motion of the wave and the up and down motion of the spray action. In the preferred embodiment, each motion of the robot 10 is controlled by one air piston 32 and one solenoid 36. However, it should be appreciated that more complex movements may be accomplished using several pistons 32 and/or solenoids 36. Other mechanical elements, such as linkages, cams and the like may also be utilized to simulate more complex or erratic movements. It should be appreciated that other means for moving the individual elements of the robot 10 are contemplated, such as hydraulics and electric motors. It has been observed, however, that pneumatics provide the ideal pressure and control for the particular motions desired of the robot 10.

Air is delivered from solenoid 36 to piston 32 using a flexible hose, such as ⅛" poly flex hoe, and it has been found that 65 p.s.i. is an ideal air pressure for all simple movements of the robot 10.

The robot's 10 movements are initiated using a sensor 40 which detects the presence of an automobile in position in front of the robot 10. A variety of sensors 40 may be utilized, including weight sensors, optic sensors or manual switches. In the preferred embodiment, however a magnetic sensor 40 is used, comprising a magnetic field amplifier 42 that uses a floor pad 44 in the car wash tunnel. An example of the amplifier is an LDU-55 loop detector. In operation, the floor pad 44 sends out a magnetic field that senses the presence of metal in the car that is to be washed. If metal is detected, a relay in the amplifier 42 is closed, thereby powering up the robot 10 using 12 volts of dc current. The detection of an automobile also initiates the magnetic starter 46, which starts the high-pressure spray gun 16. In addition to initiating the operation of the robot 10, the magnetic field amplifier 42 also serves to continually detect the presence of an automobile in front of the robot 10 to thereby maintain the robot 10 in operation as long as the automobile is in position. Accordingly, the robot 10 may be used to spray the entire side of the automobile as it moves past the robot 10.

It should be appreciated that the robot 10 may be placed at any stage in the car wash cycle, including prior to entering the car wash, within the car wash itself, and even at the end of the car wash cycle. In addition to operating the spray gun 16, the robot may also be used to apply soap or wax to the surface of the car, or operate a scrubber, or even operate a dryer after the car has been washed. Of course, each different function would require different linkages and controls so as to properly operate the mechanical device the robot 10 is holding. Furthermore, multiple robots 10 may be utilized in the same line, each with the same function or each with different responsibilities—for example, one robot can spray water, another can dispense soap and a third can dry.

Having thus described the invention with particular reference to the preferred forms thereof, it will be obvious that various changes and modifications can be made therein without departing from the spirit and scope of the present invention as defined by the appended claims.

What is claimed is:

1. A method for washing the exterior surface of a car within an automated car wash, said method comprising the steps of:

providing a water spray gun;

providing an anthropomorphic mechanized robot in a fixed position, said robot having at least one appendage for receiving and operating said spray gun, said robot further including a plurality of mechanical linkages;

providing a magnetic sensor for sensing the presence of said car in proximity to said mechanized robot;

sensing the presence or absence of said car using said magnetic sensor;

alternately activating said robot and said spray gun when said magnetic sensor detects the presence of said car and deactivating said robot and said spray gun when said magnetic sensor does not detect the presence of said car;

controlling the movement of said linkages of said robot to operate said spray gun in a predetermined pattern to wash said exterior surface of said car after activation of said robot and said spray gun, and controlling the movement of said linkages to simulate lifelike movement of said robot and to entertain the occupants of said car during washing.

2. The method of claim 1, wherein said mechanized robot comprises a framework composed of a rigid material including an upper skeleton and a base.

3. The method of claim 1, wherein said magnetic sensor comprises a magnetic field amplifier connected to a floor pad, further including the step of generating a magnetic field by said magnetic field amplifier.

4. The method of claim 1, wherein said spray gun is operable at 800 p.s.i.

5. The method of claim 2, wherein said plurality of linkages is interconnected with a network of pumps and hoses operable to move said robot and said appendage, said linkages, pumps and hoses being housed within said framework.

6. The method of claim 3, wherein the step of sensing the presence of said car is accomplished when said car interrupts said magnetic field.

7. The method of claim 5, wherein said pumps comprise a system of pneumatic pumps further comprising a variety of air pistons individually controlled by solenoid valves.

8. The method of claim 6, wherein said mechanized robot further includes a control system comprising a relay connected to said magnetic sensor, further including the step of providing power to said robot upon sensing the presence of said car.

9. The method of claim 7, wherein said system of pumps further includes a repeat cycle timer, further including the step of controlling said solenoid valves using said repeat cycle timer.

* * * * *